UNITED STATES PATENT OFFICE.

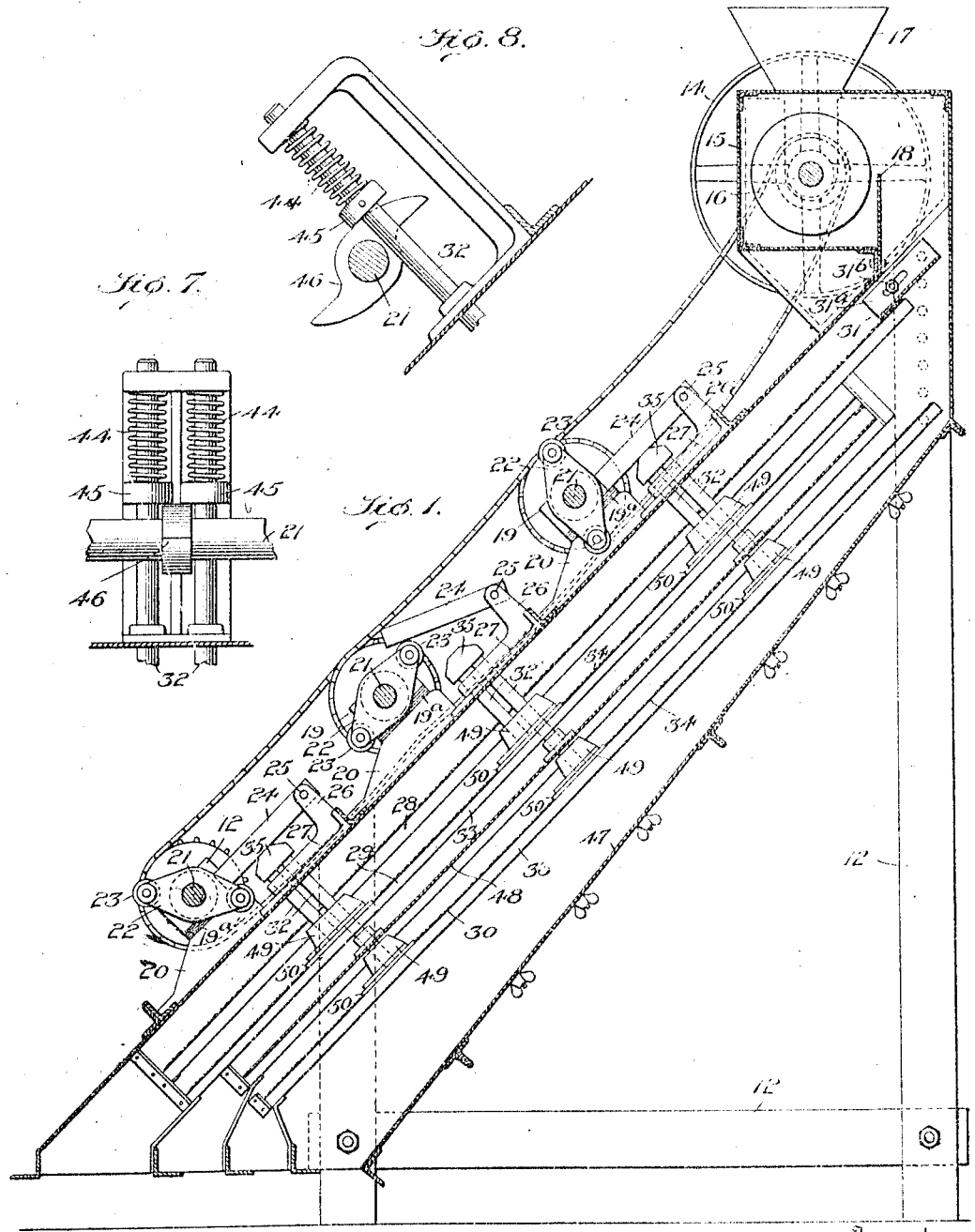

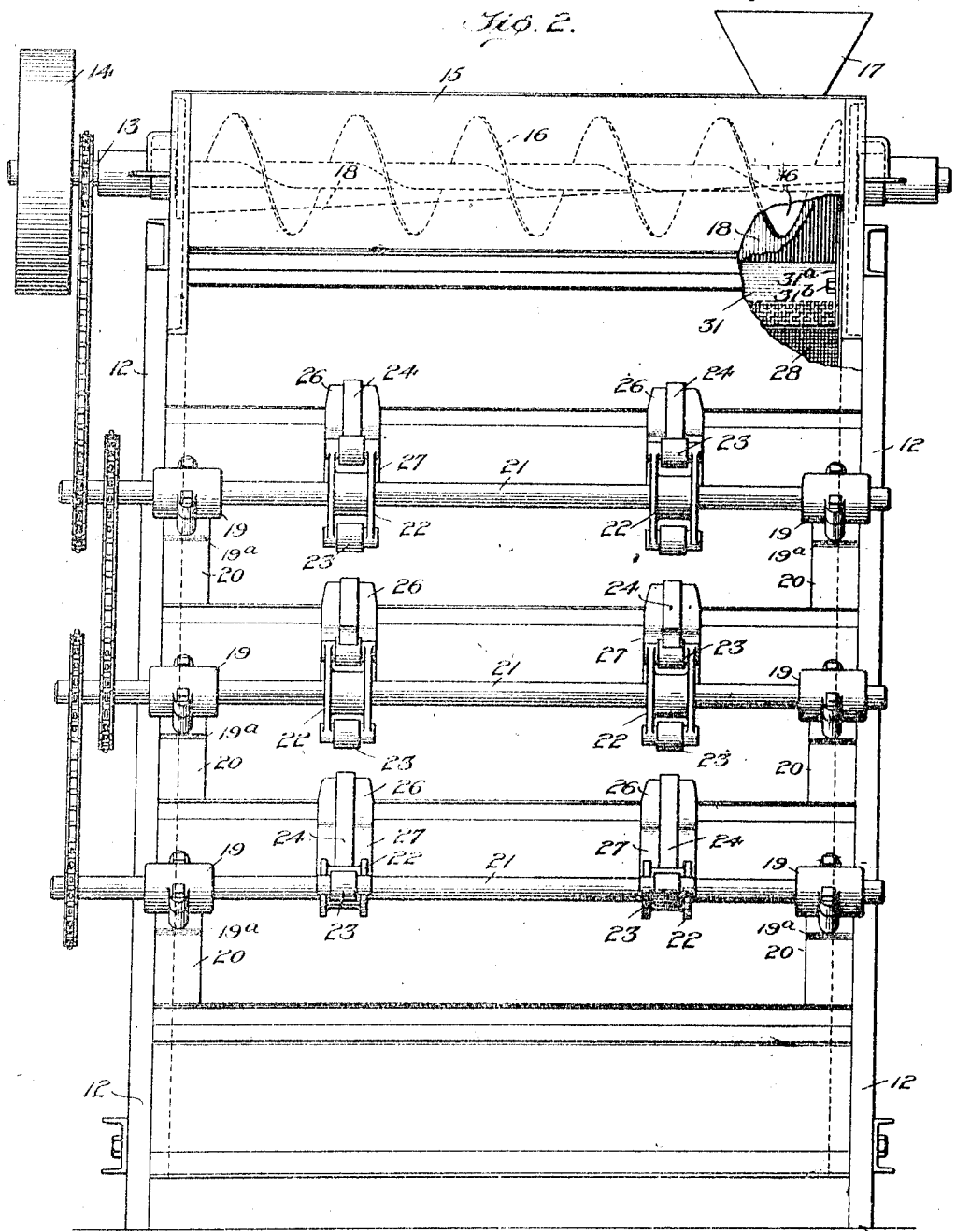

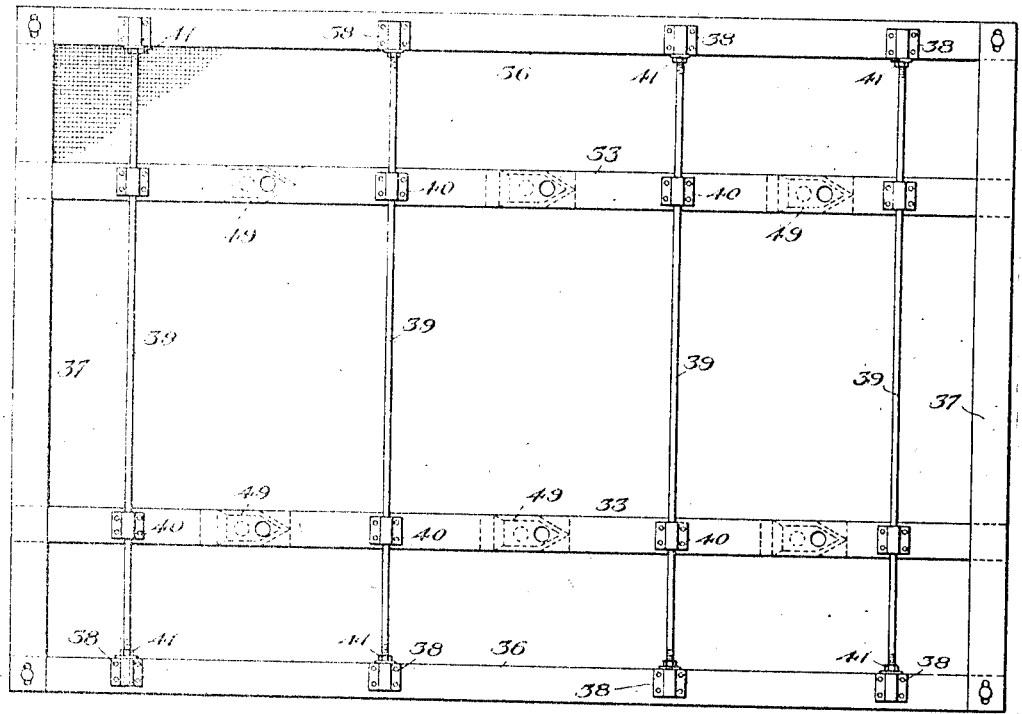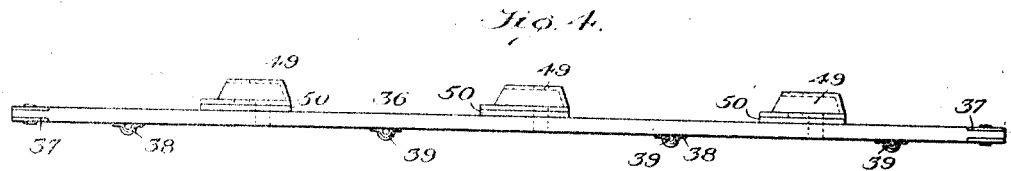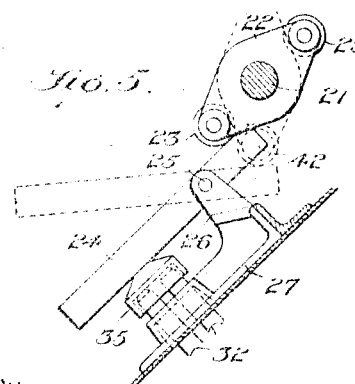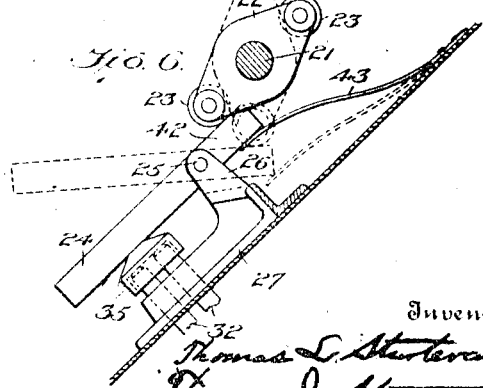

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, A CORPORATION OF MAINE.

SCREENING OR SEPARATING MACHINE.

1,035,262.  Specification of Letters Patent.  Patented Aug. 13, 1912.

Application filed May 4, 1910. Serial No. 559,280.

*To all whom it may concern:*

Be it known that we, THOMAS L. STURTEVANT and THOMAS J. STURTEVANT, both citizens of the United States, residing, respectively, at Quincy and Wellesley, in the county of Norfolk and State of Massachusetts, have invented or discovered certain new and useful Improvements in Screening or Separating Machines, of which the following is a specification, reference being had therein to the accompanying drawings.

This invention relates to that class of screening or separating machines in which the screens are jarred by percussive action, and the invention has for its object to provide a screening or separating machine, of the character referred to, which will effectively perform the function for which it is intended, and which is adapted for rapid action so as to secure a large output.

In the accompanying drawings, Figure 1 is a sectional side view of the improved screening or separating machine, and Fig. 2 is an elevation thereof. Fig. 3 is a detail view of one of the screens, and Fig. 4 an edge view of the same. Figs. 5, 6, 7 and 8 are detail views illustrating different forms of the percussive mechanism.

Referring to the drawings, 12 denotes a suitable framework at the upper portion of which is mounted a driving shaft 13 provided with a driving pulley 14, said driving shaft passing through a feed box 15 and serving to operate a feeding screw 16 which will distribute the material, entering from the hopper 17, in the said feed box. One side of the said feed box preferably comprises a plate 18 having an inclined upper edge, so as to be of a gradually decreasing height away from the hopper, and over which plate the material to be fed is forced by the said feed screw.

Journaled in suitable boxes 19, properly secured to supports 20 mounted on the inclined side pieces of the frame 12, are the hammer-lifting shafts 21 which are operatively connected, preferably by chain and sprocket-wheel gearing, with the driving shaft 13. The shafts 21 are provided with crank arms 22 carrying crank pins on which are preferably mounted rollers 23 for lifting the hammers 24, although, if desired, the rollers may be omitted and the crank pins on which the rollers are mounted may serve to engage the hammers directly. The hammers 24 are mounted on fixed pivot pins 25 supported by uprights 26 projecting from cross bars 27 which are sustained by the frame 12.

In the preferred form of the invention herein shown the improved screening machine or separator preferably comprises a plurality of screens 28, 29 and 30, each of said screens consisting of a suitable frame rigidly mounted on the framework 12 of the screening machine or separator and to which screen frame is suitably attached the woven wire or screen clothing constituting the screen proper. In this embodiment of the invention comprising a plurality of screens, disposed one above the other, the upper screen will preferably consist of a relatively coarse-mesh heavy wire screen which will remove the coarser parts of the material being separated, and thus avoid injury and unnecessary wear of the screen clothing of the finer screens beneath, this upper, coarse-mesh screen being termed a "scalping" screen. In the present machine the screen clothing of the lower screens 29 and 30 will preferably be of equal fine mesh, so that the output of these two fine mesh screens will be of equal fineness. All of these screens, as will be understood, are mounted in an inclined position, as shown in Fig. 1, and the upper end of the screen 30 is arranged so as to extend beyond the upper end of the screen 29. With this arrangement of the two fine mesh screens, properly set, about an equal amount of material will be fed to each through the coarser scalping screen 28. The material as it is fed from the feed box 15 onto the scalping screen 28 is usually reduced to such a degree of fineness that a considerable portion of the material will immediately pass through the upper end of the scalping screen 28 onto the screen 30, and from this it will result that the remainder or about an equal amount of material can be fed to each of the fine-mesh screens, as above stated. The feed of the material onto the lower screen 30 may be regulated by changing the position of an adjustable cross bar or receiving plate 31 onto which the material passing over the plate 18 of the feed box first falls.

The adjustable bar or plate 31 rests upon the top of the upper end of the scalping screen 28, as shown in Fig. 1, and blanks or covers a part of the upper end of said scalping screen, so that by adjusting said plate up or down the feed of the material from the scalping screen onto the lower screen 30 may be varied as may be desired. The receiving or blanking plate 31 is arranged practically in the same plane as the scalping screen 28, and the material coming from the feed box 15 falls onto the said receiving and blanking plate 31, and from thence slides directly onto the scalping screen, so that the said receiving plate avoids wear which otherwise might be occasioned at the upper end of the scalping screen by the impact of falling material. Much of the crushed material handled by the class of separators to which this invention relates is of a hard and sharp character such as would occasion considerable wear by falling impact, particularly of the coarser parts of such material. By virtue of the receiving plate 31, onto which the material falls and from which it slides to the scalping screen, undue wear at the top portion of the latter will be avoided, as will be understood.

Beneath the hammers 24 are arranged the impact bars 32 which pass through suitable guides 49 and the lower ends of which are preferably arranged to be in contact with protecting plates 50 on bars 33 overlying the wire cloth screen clothing 34 of the fine mesh screens, so that the screen clothing will not be injured by the percussive action of the said impact bars. These impact bars are preferably arranged in pairs, as shown, and are provided at their upper ends with caps 35 which are acted directly upon by the hammers 24, and which thus serve to distribute the force of the blows of the hammers about equally between the two impact bars of the pair. The different bars of each pair act on different screens, so that a single hammer will serve to jar a plurality of screens between which the percussive impact of the hammer will be divided. To provide for a variation of the list of the hammers 24, and thus vary the force of their strokes, the boxes 19 in which the shafts 21 are journaled, are made vertically adjustable by inserting a greater or lesser number of shims 19ᵃ between said boxes and their supports 20.

Each of the screens preferably comprises a frame consisting of side bars 36 and end bars 37, the side bars being provided with plates 38 into which extend the ends of tension rods 39 passing through plates 40 on the protecting bars 33. The end portions of the rods 39 are screw-threaded, and on the threaded portions of said rods are mounted nuts 41 bearing against the inner ends of the plates 38 or against the inner sides of the side bars 36. The screen clothing will be attached in any suitable manner with the side bars 36, and as the said bars are movably mounted, by virtue of pin-and-slot connections, on the end bars 37, it will be evident that by screwing up the nuts 41 the wire mesh screen clothing attached to the said side bars may be suitably stretched, or placed under any suitable degree of tension, as is desirable in order to enable it to have a proper vibrating effect. With this improved construction, whereby the tension of the wire mesh screen clothing may be positively adjusted by screw action, it will not be necessary to employ stretching springs such as have in some instances heretofore been used to hold wire-mesh screen-clothing under suitable tension.

The adjustable regulating plate 31 overlies the upper end of the coarse mesh or scalping screen and prevents material from passing through a portion of the same. Moving said plate 31 down from the upper end of the scalping screen cuts off a part of screening surface feeding the lower fine screen 30, and diminishes the feed to this screen. Moving the slide plate up increases the surface of the scalping screen over the lower fine screen 30 and permits a greater portion of the product passing through the scalping screen to go to the lower screen. It will thus be seen that the product passing the scalping screen can be easily divided between the two fine screens; cutting off a portion of the feed to one screen increases the amount of material fed to the other, and vice versa. This adjustment of the plate 31 may be effected by virtue of the slotted flanges 31ᵃ at the ends of said plate and through which pass the bolts 31ᵇ by which said plate is secured in any desired position.

Instead of arranging the hammers 24 so that their free ends are lifted by the revolving cranks or rolls, as shown in Fig. 1, the said hammers may be provided with short arms 42, extending beyond their pivot-pins, and which short arms may be acted upon by the revolving cranks to lift the said hammers, as shown in Figs. 5 and 6. The hammers 24 may operate either simply by gravity, as shown in Figs. 1 and 5, or they may have their action accelerated by means of springs 43, as shown in Fig. 6.

Instead of employing hammers for giving percussive action to the impact bars 32, the percussive effect of said bars may be secured by the weight of said bars alone, or by the weight of said bars augmented by coiled springs 44 arranged as shown in Figs. 7 and 8, where the said bars are represented as being provided with collars 45 forced by the action of the springs 44 against rotating lifting cams or tappets 46 arranged to raise two impact bars simultaneously in opposition to gravity augmented by the action of the accelerating springs 44.

The cranks or cams by which the hammers or the impact bars are lifted will, in practice, preferably be rotated at such a speed that when a hammer or impact bar is released from one lifting roller, crank or cam it will be caught, at its rebound, by the next succeeding lifting roller, crank or cam, thereby avoiding, so far as possible, such deadening of the vibratory action of the screens as would otherwise result from the weight of the hammers or percussion parts. Also in this improved construction the deadening effect on the vibrations of the screen, such as results in some prior constructions in which the hammers have more or less drag on the impact bars after delivering their strokes, is avoided.

Beneath the screens is arranged an inclined floor 47 which has an angle of inclination greater than that of the inclined screens. This floor is preferably removably secured in place by means of screws and thumb nuts so as to serve as a door which may be readily removed when access to the screens is desired, or the said screens may be placed in position, before the removable floor or door is secured in place, through the opening or aperture afterward closed by the said removable floor or door. By arranging the said floor or door at a steeper angle than the angle of inclination of the screens, a free discharge of the material passing through the lower screen will be provided for. The screened material passing through the upper fine-mesh screen 29 will be received in the pan or receptacle 48 interposed between said screen and the lower fine-mesh screen 30, and the said pan or receptacle may be open at its lower end for the free discharge of the screened material.

From the foregoing it will be understood that the present invention or improvement provides a screening or separating machine in which the screen frames are rigidly supported or rigidly mounted on the machine frame and in which the screen-clothing is positively adjusted to any desired tension on the screen frames and is positively held under such tension; while the improved construction also provides a plurality of percussively agitated fine-mesh screens which are more or less protected, by the overlying coarse-mesh "scalping" screen, from the wear which might otherwise be caused by coarse pieces of material. Also the two screens give, in this plural arrangement, double the fine output of an ordinary single fine screen, thus attaining a doubled output at a cost not much in excess of that of a single fine mesh screen separator.

The invention is not to be understood as being limited, however, to any particular number of screens, or to the use of a coarse-mesh scalping screen in connection with two fine-mesh screens agitated by the improved jarring mechanism herein shown, as this jarring mechanism may be used in connection with one, two, or more fine-mesh screens, of equally fine or of varying mesh, with or without a protecting coarse-mesh or "scalping" screen. Also the details of the improved screening or separating machine may be otherwise varied without departing from the scope or essence of the present invention.

Having thus described our invention, we claim and desire to secure by Letters Patent:

1. In a separator, the combination with a plurality of screens, of percussive means for agitating said screens comprising impact bars in pairs, a cap on each of the said pairs of impact bars, and vibrating hammers acting percussively on said caps.

2. In a separator, the combination with a plurality of inclined screens comprising wire mesh screen clothing having protecting plates or surfaces, of percussive means comprising impact bars in pairs normally in contact with said protecting plates or surfaces, a cap on each of the said pairs of impact bars, vibrating hammers acting percussively on said caps, and rotating means for lifting said hammers.

3. In a separator, the combination with a plurality of inclined screens comprising wire mesh screen clothing provided with protecting plates or surfaces, of percussive means for agitating or jarring the said screens, said percussive means comprising impact bars, in pairs, a cap on each of said pairs of impact bars, and a vibrating hammer acting percussively on each of said caps, the different bars of each pair acting on different screens.

4. In a separator, the combination with a plurality of inclined, rigidly mounted screens comprising wire mesh screen clothing provided with protecting plates or surfaces, of percussive means for agitating or jarring the screen, said percussive means comprising impact bars, in pairs, a cap on each of the said pairs of impact bars, and vibrating hammers acting percussively on said caps, the different bars of each pair acting on different screens.

5. In a separator, the combination with one or more inclined screens, of impact-bars independent of and acting percussively on said screen or screens, pivoted hammers acting on said impact-bars, means for lifting said hammers, and means for varying the lifting movements of said hammers.

6. In a separator, the combination with one or more inclined screens, of impact-bars independent of and acting percussively on said screen or screens, pivoted hammers acting on said impact-bars, rotating shafts, means carried by said shafts, for lifting said hammers, boxes in which said shafts are journaled, and means for varying the lifting movements of said hammers, said varying means comprising shims, a greater or lesser number of which may be inserted beneath said boxes to raise or lower the same.

7. In a separator, the combination with one or more inclined screens, of independent impact-bars loosely engaging said screen or screens, and vibrating, spring-accelerated hammers acting on said impact-bars.

8. In a separator, an inclined, coarse-mesh or "scalper" screen, a plurality of inclined fine-mesh screens beneath said coarse-mesh screen, and adjustable means whereby more or less of the product passing through said coarse-mesh screen may be divided between the said fine mesh screens and discharged onto them.

9. In a separator, an inclined, coarse-mesh or "scalper" screen, a plurality of inclined fine-mesh screens beneath said coarse-mesh screen, a partition between said fine-mesh screens, and adjustable means whereby more or less of the product passing through said coarse-mesh screen may be discharged onto either of said fine-mesh screens.

10. In a separator, a coarse mesh or scalping screen, in combination one or more fine screens, and a plate arranged to cover a part of the surface of said scalping screen, and thus prevent said surface from delivering its product except at predetermined places.

11. In a separator, a coarse mesh or scalping screen, in combination one or more fine screens, and an adjustable plate to vary the places at which said scalping screen will deliver its product to the said fine screens.

In testimony whereof we affix our signatures, in presence of two witnesses.

THOMAS LEGGETT STURTEVANT.
THOMAS JOSEPH STURTEVANT.

Witnesses:
  L. N. STURTEVANT,
  H. A. TOMLINSON.